US007240101B2

(12) United States Patent
Rich et al.

(10) Patent No.: US 7,240,101 B2
(45) Date of Patent: Jul. 3, 2007

(54) METHOD AND APPARATUS FOR EFFICIENTLY REFLECTING COMPLEX SYSTEMS OF OBJECTS IN XML DOCUMENTS

(75) Inventors: L. Scott Rich, Apex, NC (US); Ritchard L. Schacher, Apex, NC (US); Daniel Berg, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 09/824,614

(22) Filed: Apr. 2, 2001

(65) Prior Publication Data
US 2002/0143941 A1    Oct. 3, 2002

(51) Int. Cl.
*G06F 15/16* (2006.01)
*G06F 9/44* (2006.01)

(52) U.S. Cl. ........................ 709/219; 709/246; 717/120

(58) Field of Classification Search ........ 709/217–219; 700/73; 717/100–125; 711/118; 707/100–108; 719/313–319
See application file for complete search history.

(56) References Cited

U.S. PATENT DOCUMENTS

| | | | | | |
|---|---|---|---|---|---|
| 5,944,781 | A | * | 8/1999 | Murray | 709/202 |
| 5,945,992 | A | * | 8/1999 | Cunniff | 715/748 |
| 6,167,564 | A | | 12/2000 | Fontana et al. | 717/1 |
| 6,199,081 | B1 | | 3/2001 | Meyerzon et al. | 707/513 |
| 6,223,345 | B1 | * | 4/2001 | Jones et al. | 717/100 |
| 6,412,010 | B1 | * | 6/2002 | Kind | 709/230 |
| 6,430,564 | B1 | * | 8/2002 | Judge et al. | 707/100 |
| 6,523,042 | B2 | * | 2/2003 | Milleker et al. | 707/102 |
| 6,542,908 | B1 | * | 4/2003 | Ims | 719/315 |
| 6,546,546 | B1 | * | 4/2003 | Van Doorn | 717/114 |
| 6,560,769 | B1 | * | 5/2003 | Moore et al. | 717/100 |
| 6,584,612 | B1 | * | 6/2003 | Mueller et al. | 717/166 |
| 6,651,140 | B1 | * | 11/2003 | Kumar | 711/118 |
| 6,665,861 | B1 | * | 12/2003 | Francis et al. | 717/120 |

(Continued)

OTHER PUBLICATIONS

Java Object Serialization Specification; sections 1.1-1-4; downloaded from Java.sun.com website © 1999.*

(Continued)

*Primary Examiner*—David Wiley
*Assistant Examiner*—Joseph E. Avellino
(74) *Attorney, Agent, or Firm*—Synnestvedt & Lechner LLP (57) ABSTRACT

The invention provides an efficient method and apparatus for exchanging data between two entities, such as two application programs or a resource library and an application program. The invention provides a mechanism for populating a complex object model implementation in accordance with the particular data format preferred by the receiving entity from one or more external data formats on the fly responsive to a request for data. The method and apparatus allow the registration of resource factories which can produce resources through mechanisms other than the traditional parsing of a file. One implementation of this is using the URL scheme to identify the factory to handle a request, and allowing that factory to create a specialized Java package resource.

The method and apparatus allow the registration of reflection adapter factories, and specialized model classes which work with those adapters, for the purpose of computing object attributes and populating the Java package resource with them. One implementation of this mechanism is a set of Java Reflection adapters which compute the properties of JavaClass model objects from the JDK reflection API'S.

8 Claims, 4 Drawing Sheets

U.S. PATENT DOCUMENTS

| | | | |
|---|---|---|---|
| 6,769,124 B1* | 7/2004 | Schoening et al. | 719/316 |
| 6,851,089 B1* | 2/2005 | Erickson et al. | 715/513 |
| 6,854,120 B1* | 2/2005 | Lo et al. | 719/311 |
| 6,862,735 B1* | 3/2005 | Slaughter et al. | 719/315 |
| 6,907,564 B1* | 6/2005 | Burchhardt et al. | 715/513 |
| 6,993,745 B1* | 1/2006 | Ballantyne et al. | 717/109 |
| 7,007,278 B2* | 2/2006 | Gungabeesoon | 719/311 |
| 7,080,078 B1* | 7/2006 | Slaughter et al. | 707/10 |
| 2002/0083087 A1* | 6/2002 | Deuser et al. | 707/500 |
| 2002/0128734 A1* | 9/2002 | Dorsett, Jr. | 700/73 |
| 2002/0169741 A1* | 11/2002 | Milleker et al. | 707/1 |

OTHER PUBLICATIONS

Abstract of Hildyard, A., "An XML Document to Java Script Object Converter", WEB Techniques, vol. 4, No. 1, pp. 63-69, Jan. 1999.

* cited by examiner

METHOD AND APPARATUS FOR EFFICIENTLY REFLECTING COMPLEX SYSTEMS OF OBJECTS IN XML DOCUMENTS

FIELD OF THE INVENTION

The invention pertains to the generation and retrieval of objects in an object-oriented programming environment. More particularly, the invention pertains to populating an internal object model for an application program from an external representation of those objects such as an XML document.

BACKGROUND OF THE INVENTION

It often is necessary for two application programs to exchange data with each other or for application data used by an application program to be stored in a resource library separate from the application program. For instance, certain data may be used by many different application programs. Therefore, it is efficient to store data in discrete data units (e.g., objects) in a database or other resource library that is accessible to each of the plurality of application programs that may need access to that data. Accordingly, mechanisms have been devised for efficiently transporting data between two computing entities. The two computing entities, for example, may be two application programs or a resource library and an application program or even two different resource libraries. A front-end software module, such as an Application Program Interface (API) module, may be designed to intercept the transport mechanism before it reaches the second application program, parse the data from the transport mechanism to extract the application data and deliver it to the second application program.

XML (eXtensible Markup Language) is a platform-independent programming language that is commonly used in connection with transporting data between two application programs and/or between an application program and a resource factory. It provides a flexible way to create common information formats and share both the format and the information with or amongst a plurality of application programs, particularly on distributed networks like the Internet. Like HTML (HyperText Markup Language), XML code comprises mark-up symbols that describe the content of a file (often termed a page in HTML lingo or a document in XML lingo). Unlike HTML, which only describes how to display and interact with the document or the data within the document, XML describes the content of the document in terms of what data is being described.

Further, unlike HTML, XML is extensible, i.e., the mark-up symbols allowed in XML are unlimited and self-defining. That is, XML programmers are not limited to a standard set of defined mark-up symbols and tags and can create custom mark-up symbols and tags. In this specification, a basic familiarity with XML is assumed in the reader.

An XML document, therefore, can be processed purely as data by a program. Accordingly, one of the transport mechanisms commonly used for exchanging data between two software applications, e.g., an application server and a client, or between a resource library and an application program, is to embed the data in XML documents that can be transferred between two application programs or from a resource library to an application program (such as over a network using well known transfer protocols). In essence, XML provides a system for placing structured data in a document in a way that it can be exchanged between application programs over a network.

An XML parser software module runs at the front end of the application program and parses the XML document to extract the data from the document.

Java is an object-oriented, platform-independent programming language specifically designed for use in distributed network environments, such as the Internet, that is well known and is commonly used in connection with transporting data between two application programs. In this specification, a basic familiarity with Java and Enterprise JavaBeans also is assumed in the reader.

Java code can define classes, objects, attributes, packages, etc., all as well known in the art. Java code can be embedded within an XML document as content of the document. Java classes provide a way to structure data that can be readily exchanged between application programs using, for example, Java Development Kit (JDK) APIs and Java.lang.reflection APIs. Accordingly, it is well known in the prior art to define Java classes, populate the Java class model with application data, and store the information in XML format in an XML document for exchange between application programs or between a resource library and an application program. Put simply, the data is represented in a Java class model data structure and that data structure is stored as content in an XML document for transfer between application programs. An object in Java is an instance of a class.

The receiving application program is front ended by an XML parser program that can parse XML documents and extract Java objects therefrom. Merely one of many possible examples in which application data is transported as described above is in software application modeling and development, where the application data is often referred to as metadata. The complete set of XML documents and Java code to express an application program's metadata can be extremely large and complex.

In modern times, in which distributed networks (of which the Internet is merely one example) are ubiquitous, it is common for one application program that uses the same data as a second application program to require the data to be in a different format. For instance, two different vendors may provide software that a customer may wish to integrate into a larger computing system in which the software from one of the vendors generates data that will then be passed to the software of the other vendor for further processing. However, these two vendors may use different formats for data. Accordingly, many transport mechanisms are platform and/or format independent in order to provide a mechanism by which data can be transported between two computing entities that may use different platforms and/or data formats. Accordingly, data generated by one application program in a first format can be embedded in one of these platform and format independent transport mechanisms for transport.

The receiving application program typically will have a front-end software module, e.g., an API, designed to, not only intercept the transport mechanism and parse the data therefrom before it reaches the actual application program tools, but that also determines the format of the received data and, if it is in an external format (i.e., a format other than the internal format used by the application program tools of the receiving entity), converts it to the internal format used by the application program tools.

Generally, metamodel data classes have been tightly coupled to an XML format or to an external format. Accordingly, in order to enable an application program to use application data received from application programs in different formats, application programmers had to write an implementation for each different format. Alternately, the application program that generates and/or transmits the data to another application program would need to have different implementations of the Java classes for each different format employed by an application program to which it transmits application data.

Figure 1:
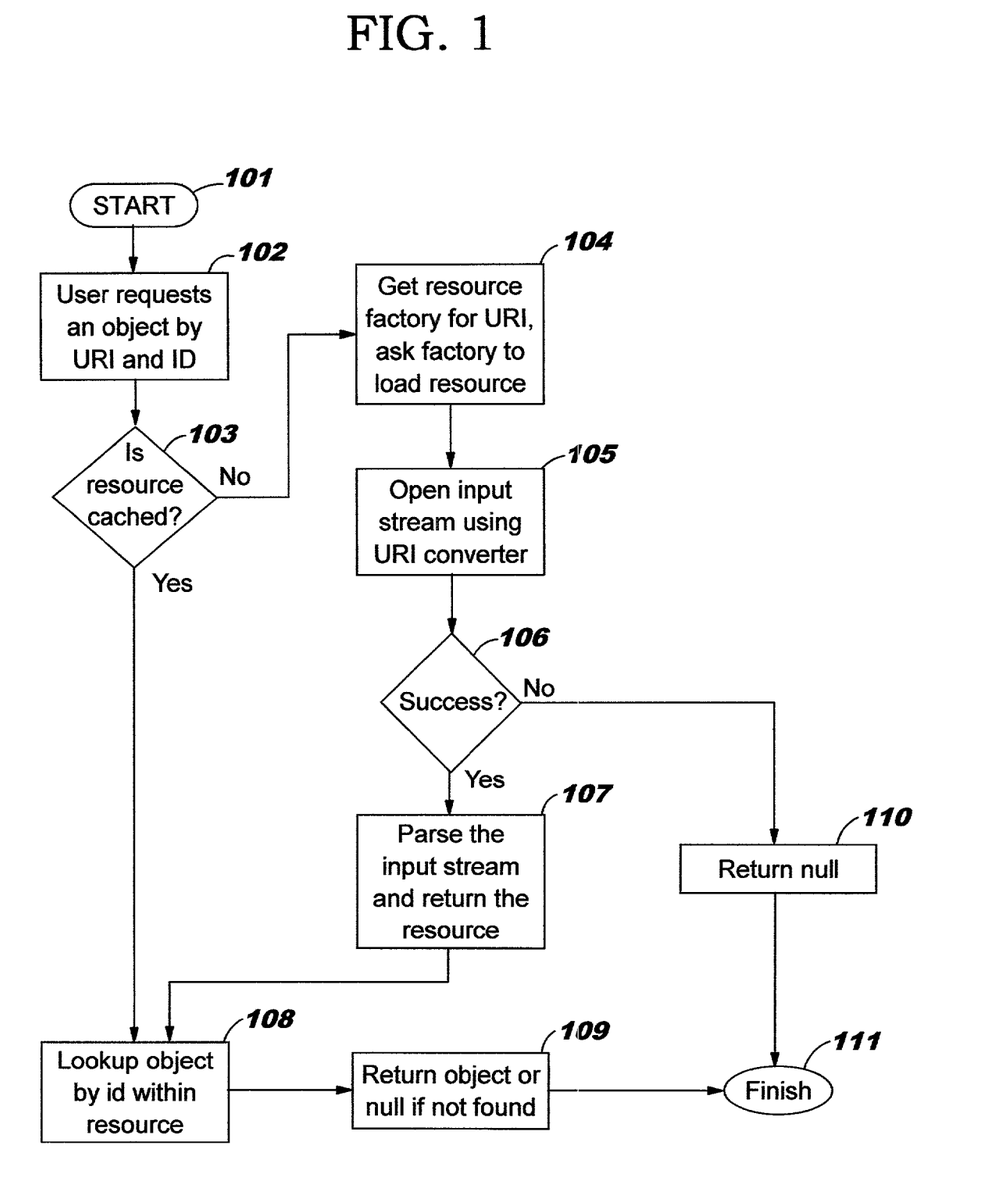
FIG. 1 is a flowchart illustrating a process for loading and parsing an XML document to extract Java objects therefrom in accordance with the prior art.

FIG. 1 is a flow chart illustrating operation of an API in accordance with the above-discussed, prior art approach. In this example, all data that an application program tool (hereinafter tool) might need to retrieve is stored in a data repository and is transported between modules as Java constructs (e.g., objects) embedded in XMI documents.

The process starts at step 101. In step 102, the user of a tool performs an operation that causes the application program to seek data. The tool is aware of a naming protocol for resources that may be stored in a resource repository database and thus generates a request for a specific XMI document and Java object within that document. The tools typically maintain caches of data (e.g., objects, classes, etc.) used recently. Accordingly, in step 103, it first checks if the resource to which the requested object corresponds is already cached, since, if it is already cached, there is no need to perform all of the steps alluded to above to retrieve and parse data from an XMI document and convert to the internal data format.

Thus, if that resource is cached, flow proceeds from step 103 to step 108 where the object is identified in the cache. In step 109, the object is retrieved from the cache and returned to the tool (or, if the object is null in the cache, the tool instead is informed of that fact). The process would then end at step 111.

However, if the corresponding resource has not been cached, flow proceeds to step 104 in order to load the object in the manner summarized above. Specifically, in step 104, the resource repository calls a resource factory that uses a URI converter that takes the URI specified in the request and returns the contents of that URI. In step 105, the URI converter attempts to open the input stream from the document and return the resulting input stream, as is well known in the art. In step 106, it is determined if the stream has been successfully retrieved and converted. If not, the process has failed and flow proceeds to step 110, in which null data is returned to the tool. The process then terminates at step 111.

Assuming the stream is successfully retrieved and converted in step 106, flow will proceed to step 107. In step 107, the input stream is parsed into the individual objects and the resource containing the objects is written to the cache. Flow then proceeds to steps 108 and 109, where the particular one of the objects in the parsed document that was requested is located in the resource and returned to the tool. The process ends at step 111.

In this routine, the entire XMI document within which the requested object is contained is retrieved, converted, parsed and written to the cache, even though only a single object was requested.

Further, the complete set of XML documents and Java code to express an application program's metadata can be extremely large and complex. When there are multiple formats for expressing the metadata, the size and complexity of the system is further increased and, particularly, there is much more data that must be retrieved, converted, parsed, and stored.

It would be desirable to reduce the processing overhead needed for an application program to interface to application data in different formats.

XMI (eXtensible Metadata Interchange) is a relatively recent standard adopted by the Object Management Group (OMG). XMI is an open industry standard that combines the benefits of the XML standard for defining, validating and sharing document formats with the benefits of the object-oriented Unified Modeling Language (UML). The XMI format specifies an open information interchange model intended to provide developers working in object technology with the ability to exchange programming data over a network in a standardized way. It is specifically aimed at providing a standard XML document format for object models built to the Meta Object Facility (MOF) specification. Accordingly, it provides a standard way to serialize model objects. It provides only a single format and does not address other sources of model objects.

SUMMARY OF THE INVENTION

The invention provides an efficient method and apparatus for exchanging data between two computing entities, such as two application programs or a resource library and an application program. The invention provides a mechanism for populating a complex object model implementation with the data in the particular data format preferred by the receiving entity from one or more external data formats. The object model is populated on the fly responsive to a request for the data and only those classes of the model that comprise the requested data are populated.

The method and apparatus allow the registration of resource factories which can produce resources through mechanisms other than the traditional parsing of a file. One implementation of this is using the URL scheme to identify the factory to handle a request, and allowing that factory to create a specialized Java package resource.

The method and apparatus further allow the registration of reflection adapter factories and specialized model classes which work with those adapters for the purpose of computing object attributes, which would normally have been parsed from an XMI document, and populating the Java package resource with them. One implementation of this mechanism is a set of Java Reflection adapters which compute the properties of JavaClass model objects from the JDK reflection APIs.

A software module in accordance with the present invention loads and parses XMI documents and builds objects from the contents of the XMI documents. The module can use the Meta Object Facility (MOF) defined in the Object Management Group (OMG) specification to read an eXtensible Metadata Interchange (XMI) document containing the requested data and generate therefrom a set of objects. The invention provides a mechanism for registering ways of extending the read and write capabilities with respect to XMI documents to provide ways other than the standard XMI format for reading and writing objects. For any given object model implementation, the present invention provides a Uniform Resource Identifier (URI) converter software module that can interpret an object implemented with an external format (i.e., a format other than the format used by the receiving application program) and return the appropriate internal representation (i.e., the format used by the receiving application program). The external object is primarily unpopulated. Next, a reflection adaptor is called that can adapt an internal object to its external representation. A different reflection adaptor implementation exists for each possible specific external format.

The invention can also be applied using the Enterprise Java Bean Model to populate the model from a standard XML (non-XMI) file.

DETAILED DESCRIPTION OF THE PREFERRED EMBODIMENTS

The present invention provides a novel approach to storing, retrieving, converting and parsing data in a distributed environment that substantially reduces the processing overhead involved with transferring data between computing entities in the environment. The approach is particularly useful with respect to transferring data generated in a first format by a first tool to a second tool and converting the data to the second format used by the second tool.

The method and apparatus allow the registration of resource factories which can retrieve the necessary data from a data source and create resources on the fly through mechanisms other than the traditional parsing of a file. The data source can comprises almost any form, such as a database, a document in a format other than the transport mechanism format or a live system). Accordingly, resources are not stored in memory as documents to be parsed when a request for data is received. The invention further provides a reflection mechanism for populating a complex object model implementation with data in the internal format of the requesting entity based on metadata in an external format contained in the transport mechanism document. The object model is populated on the fly responsive to a request for the data. The reflection mechanism is lazy and only those classes of the model that comprise the requested data are populated. Accordingly, an entire document need not be retrieved, converted in format, and parsed for every request for data, as was the case in the prior art.

In one preferred embodiment of the invention, application data for transfer between tools is transported as metadata within XMI documents using a Java object metamodel that describes Java packages, classes, methods and fields using the Meta Object Facility (MOF) of the OMG specification.

One implementation of this uses the URL scheme to identify and call a factory to handle a request, and allows that factory to create a specialized Java package resource, the package resource essentially being unpopulated except for the package object. Thus, when a software tool requests a data item, an essentially unpopulated instance of the resource to which that data corresponds is created.

For any given object model implementation, the present invention provides a Uniform Resource Interchange (URI) converter software module that can interpret an object implemented with an external format and return the appropriate internal representation. When a document is retrieved externally, the appropriate converter module for converting from the particular external format in which the metadata in the document is implemented to the internal format of the requesting tool is called from a repository of converter modules. The converter parses the document, converts the data from the external format to the internal format, and builds the Java package resource to which the requested data belongs, all transparently to the requesting tool. The converter leaves the package resource unpopulated, except for the package object.

The method and apparatus further allow the registration of reflection adapter factories and specialized model classes which work with those adapters for the purpose of computing object attributes, which would normally have been parsed from an XMI document, and populating the resource with them. One implementation of this mechanism is a set of Java Reflection adapters which compute the properties of JavaClass model objects from the JDK reflection API's.

Figure 2:
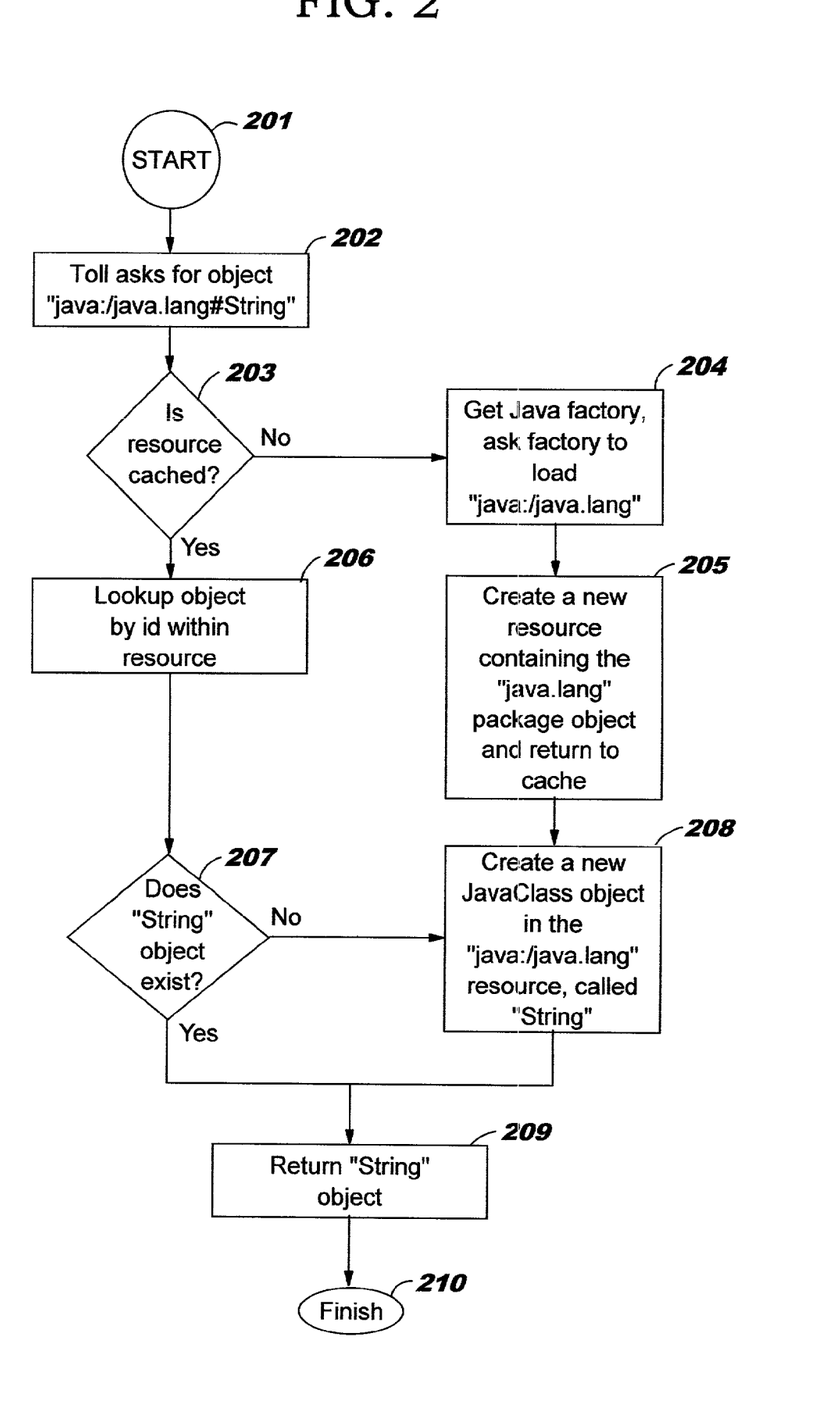
FIG. 2 is a flowchart illustrating a process creating an XMI document to containing a Java class model representation of application data in accordance with the present invention.

FIG. 2 is a flowchart illustrating the loading of a document and creation of a JavaClass object responsive to a request for data in accordance with a particular embodiment of the present invention. The process starts at step 201. In step 202, the tool asks for application data. This step is similar to step 102 of the prior art as illustrated in FIG. 1. Here, we illustrate a specific example in which the object is identified by the syntax "java:/java.lang#String". In this example, the environment is a software application modeling and development environment that users use to develop Java software. In step 202, the user has asked the system to display to him or her the description of the Java class named java.lang.String. The syntax of the request, "java:/java.lang#String" is consistent with standard URI syntax. In this URI syntax, the "java:/" portion of the request identifies the scheme of the request. The scheme "Java" is a proprietary scheme developed by the assignee of the present application relating to its Java program modeling and development tools. The portion "java.lang" is the identity of the XMI document that contains the class in which the user is interested. Finally, the portion "String" is the name of the class of interest. The "#" symbol is a URI separator that separates the document identifier from the identifier of a specific data item within that document.

Step 203 is similar to step 103 of FIG. 1 in that, before we start retrieving data externally, we first determine if the resource already exists in the cache. However, as will become clear from the discussion below, unlike the prior art technique of FIG. 1, with the technique of the present invention, just because the resource exists in the cache does not necessarily guarantee that it is fully populated. Thus, even if the resource is found in the cache, the specific object requested may not be defined in the cached resource model. Therefore, if the resource is cached, in step 206, the resource is searched for the specific object. In step 207, if the object is found in the cached resource, then flow proceeds to step 209, where the object "String" is returned to the tool.

Returning to step 203, if the resource is not cached, flow instead proceeds to step 204. The most significant aspects of the present invention reside primarily in steps 204, 205 and 208, to be described hereinbelow. The scheme portion of the request, i.e., "java:/", indicates that the request should be routed to a specialized Java factory module and the file identifier portion of the request, i.e., "java.lang", identifies which file is needed. Thus, in step 204, a request is issued to the java factory for the document "java.lang." In accordance with the present invention, the Java factory does not maintain a store of the documents and resources. Rather, it creates documents and resources on the fly responsive to requests. Thus, flow proceeds to step 205, where the Java factory creates a new resource of the "Java:/" type by querying a live system, but does not populate the resource with the requested object. In step 205, the resource is populated only with one object, namely, an object that represents the "java-.lang" package and the resource is returned to the tool's cache. In Java, a "package" is a collection of related classes and interfaces providing access protection and namespace management, as is well known in the art. Therefore, a package object defines the characteristics of the package.

Accordingly, the requested object is not in the resource at this time and flow proceeds to step 208. In step 208, the requested Java class object, "String," is created and placed in the resource. Flow then proceeds to aforementioned step 209, where the object, "String," is returned to the tool's cache. The process ends at step 210.

Since a resource is only minimally populated in response to any particular request for an object, it should now be apparent why there is a need to expressly check for the requested object (as carried out in steps 206 and 207 described above) after it is determined that the resource is cached (step 203).

It can be seen from the above-described flowchart, that resources are not stored in a resource repository, but are created on the fly responsive to requests for objects. Further, responsive to a request for an object, only as much of the resource is populated as is necessary to respond to the request. In the prior art, all of the resources used in the entire system are stored in a resource repository and, responsive to a request for an object, the entire, fully populated resource is read out of the repository and written to the requesting tool's cache. The prior art process is extremely expensive and consumes a great deal of processing power and memory space unnecessarily. The present invention eliminates the resource repository entirely and minimizes the amount of data that is read and written in response to a requests for application data (e.g., objects).

Specifically, very little is actually done in step 208. Particularly, the object, "String" was created with only enough information about it so that we can go back and get the rest of the information about the class when needed.

For instance, after the object "String" is returned, the user may request additional information about the object. For instance, the user may wish to know the methods associated with the object's class.

Figure 3:
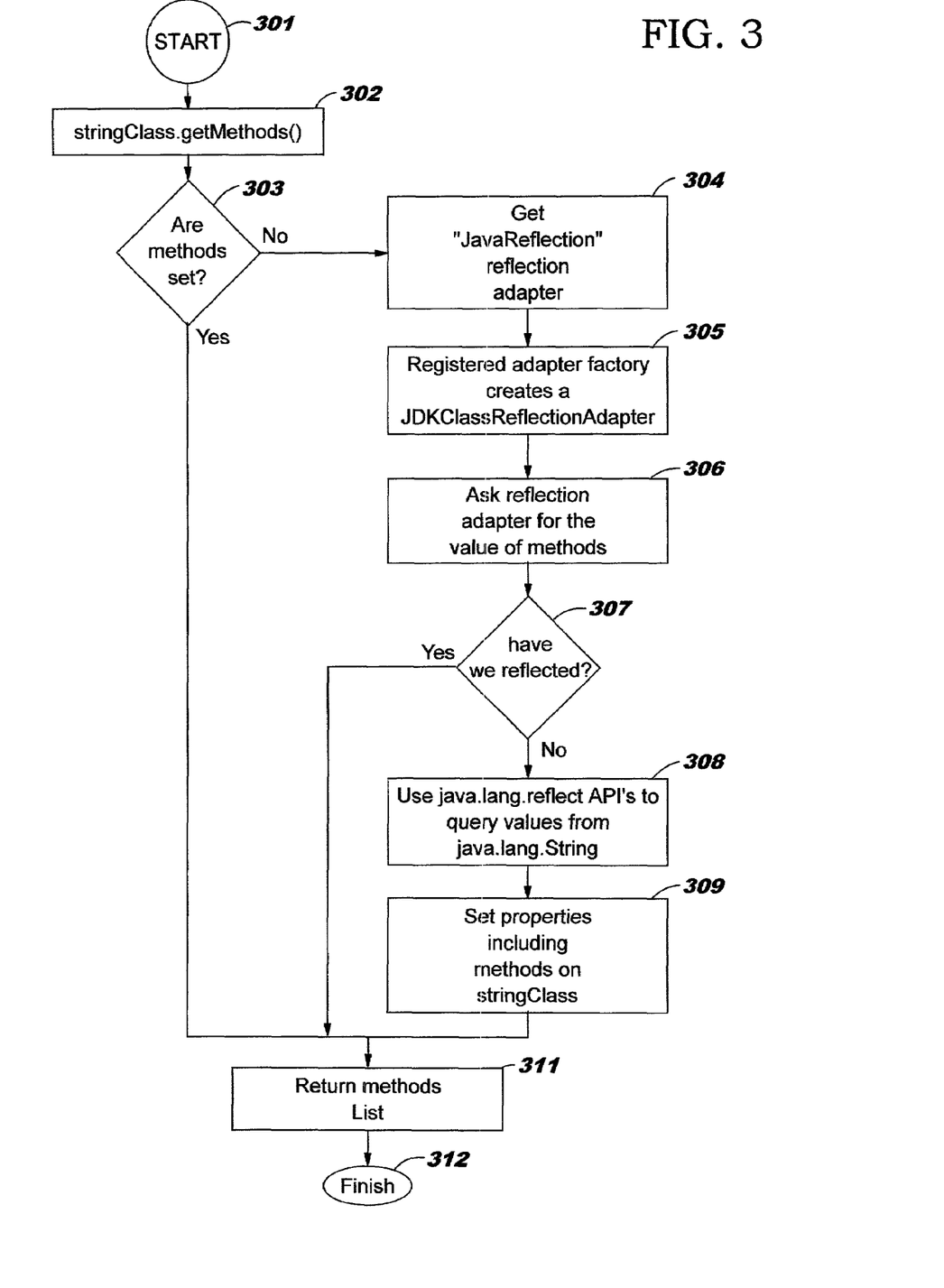
FIG. 3 is a flowchart illustrating a process for populating the Java class model retrieved by the process illustrated in FIG. 2 in accordance with the present invention.

FIG. 3 is a flow chart illustrating the processing responsive to a tool=s request for such information and particularly illustrates operation in response to an exemplary request for the methods associated with the class "String." The process starts in step 301. In step 302, responsive to the inputs by the user seeking the methods of the class "String", the tool issues a request, namely, Astringclass.getMethods( )". Responsive to this request, flow proceeds to step 303, where the cache is queried to determine if the methods are set. If the methods are set, no further processing is required and the methods list is returned to the tool (Step 311) and the process terminates (step 312).

However, if the methods are not set in the cache, then the appropriate data must be retrieved. In accordance with the present invention, the classes are designed with reflection capability. Reflection capability is a well known capability utilized in Java and other programming languages that allows an object to be queried to reveal its own properties.

Figure 4:
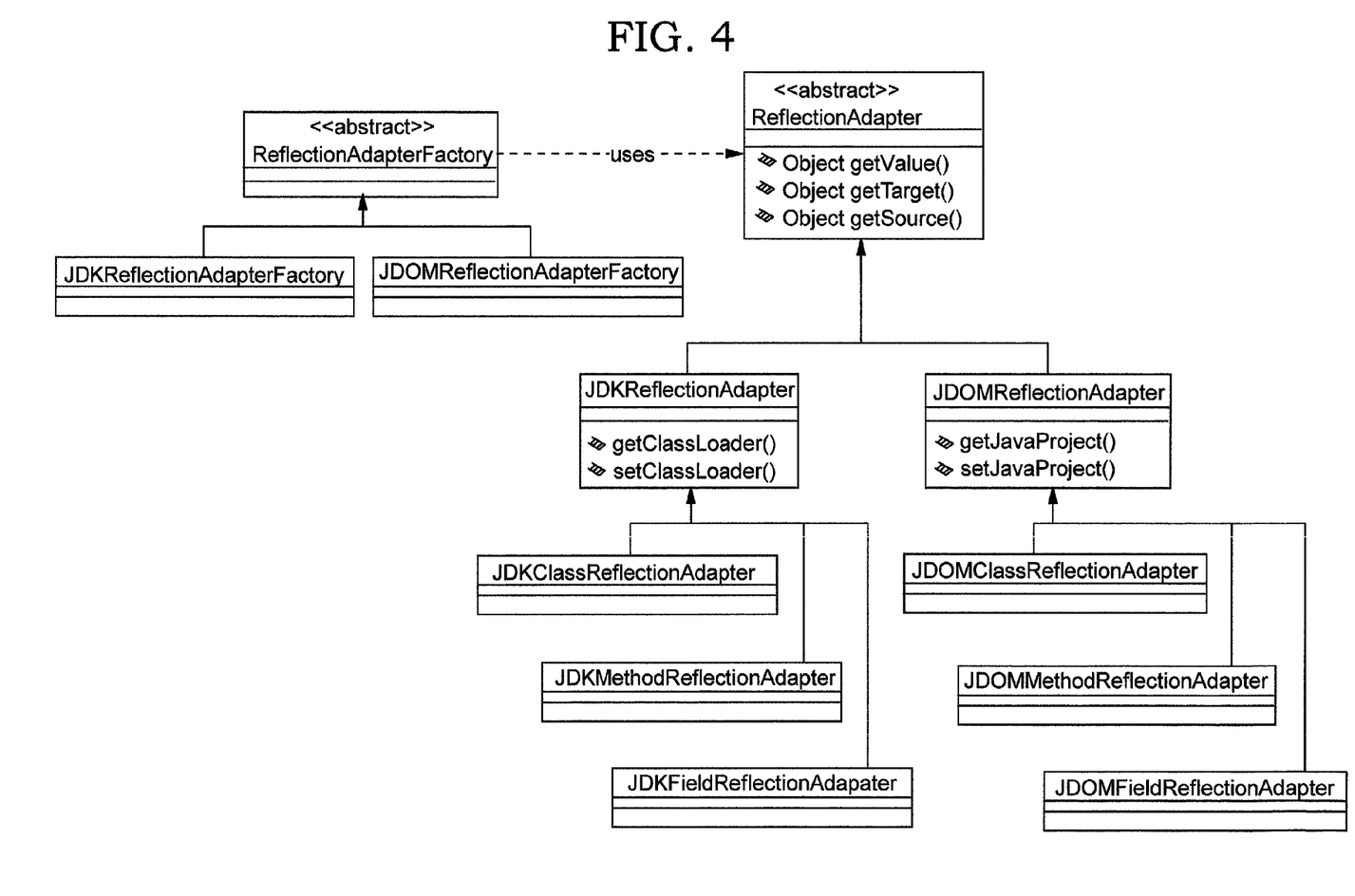
FIG. 4 is an exemplary class tree diagram showing the Java classes implementing the reflection capability for a Java model from two different external sources in accordance with the present invention.

Thus, assuming the methods property is not set, flow proceeds from step 303 to step 304. In step 304, the process queries a Java reflection factory for the appropriate reflection adapter for the relevant class (which, in this case, is named the "JavaReflection" reflection adapter). The "JavaReflection" reflection adapter knows how to retrieve the values for the methods (and other attributes) from another source, such as a database. In step 305, the reflection factory creates the appropriate reflection adapter, which, for example, is a JDKClassReflectionAdapter. The particular reflection adapter is selected based on the characteristics of the environment of the requested data. By way of example, if the modeling and development firm in this example has developed a proprietary environment corresponding to JDK and its modeling and development software is enabled in both the proprietary environment and the standard Java JDK environment, the reflection factory would need to determine which environment the request pertained to and select the correct reflection adapter. FIG. 4 is an exemplary class tree diagram showing the Java classes implementing the reflection capability for a Java model from two different external sources, namely a standard JDK source and a proprietary source (herein termed JDOM). If the request for reflection of the "String" class had been in the JDOM environment, then the JDOMClassReflectionAdapter would have been selected.

In step 306, the process asks the selected reflection adapter for the value of the particular property of interest, which, in this example, is "methods."

In step 307, the reflection adapter determines if it has already tried to get the value for the property "methods". For example, the reflection adapter maintains a flag for each possible property and sets the flag for any given property when it attempts to get the value of that property. Thus, if the flag for the property that is the subject of the particular request, e.g., "methods", is set, there is no purpose in attempting to get the value again and flow proceeds directly to step 311, in which the reflection adapter returns the value for methods.

Assuming, however, that the reflection adapter has not already reflected the value of methods for this class, flow instead proceeds from step 307 to step 308. In step 308, the reflection adapter calls the java.lang.reflection APIs. In Java, java.lang.reflection APIs are standard APIs that perform functions such as retrieving classes by name and determining their properties, like their methods, fields, supertypes, etc. The reflection adapter uses these APIs to query values regarding the class named "java.lang.String".

In at least some preferred embodiment of the invention, for any request to this reflection adapter for any property of an object that can be reflected, that property as well as all other properties of that object whose values can be reflected will be returned. In many environments, this is an advisable embodiment because it is often very expensive to obtain access to an object. Accordingly, once it is obtained, the model is populated with all of its values.

Thus, in step 308, all of the values in java.lang.String are queried. In step 309, all of the properties for which values were obtained, including the methods value, are set for stringClass. Flow then proceeds to step 311, in which all of the property values are returned to the tool. The process ends at step 312.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for exchanging Java class objects between two computing entities in an object-oriented programming environment using a transport mechanism in which said Java class objects are contained in files, each file defining a resource, each resource designed to contain a plurality of particular ones of said objects, said method comprising the steps of:
   (1) providing a resource factory for building resources in the form of XMI documents, said factory including a plurality of software modules, each software module adapted for building resources from a data source responsive to a request for a Java class object of a type to which said resource corresponds, each said software module designed to build a resource of a particular type;
   (2) responsive to a request for a Java class object from a first computing entity, selecting a software module for building a resource of the type to which said Java class object corresponds;
   (3) subsequent to step (2), building an XMI document for containing said Java class object using said selected software module, said XMI document populated with information defining said XMI document, but not containing said Java class object;
   (4) subsequent to step (3), inserting said Java class object into only said XMI document;
   (5) subsequent to step (4), transmitting said XMI document to said first computing entity using said transport mechanism; and
   (6) subsequent to step (5), providing to said first computing entity said Java class object.

2. The method of claim 1 further comprising the steps of:
   (7) providing a reflection adapter factory for populating Java class objects within XMI documents, said factory adapted to provide software modules for populating Java class objects, each said software module designed for an environment corresponding to a Java class object;
   (8) responsive to a request for a property of said Java class object, selecting a one of said reflection adapters for the environment of the particular property;
   (9) populating said Java class object with said property; and
   (10) providing to said first computing unit said property.

3. The method of claim 2 wherein said Java class object comprises a plurality of properties and step (9) comprises populating said Java class object with all properties of said Java class object that can be reflected.

4. A method for exchanging Java class objects between two computing entities in an object-oriented programming environment using a transport mechanism in which said Java class objects are contained in files, each file defining a resource, each resource designed to contain a plurality of particular ones of said Java class objects, said method comprising the steps of:
   (1) providing a resource factory for building resources in the form of XMI documents, said factory including a plurality of software modules for building resources from a data source, each said software module designed to build a resource of a particular type;
   (2) determining whether said first computing entity has stored a resource containing said Java class object;
   (3) if said first computing entity has stored a resource corresponding to said Java class object, determining if said corresponding resource stored at said first computing entity contains said Java class object;
   (4) if said corresponding resource stored at said first computing entity does not contain said Java class object, said first computing entity issuing a request for said Java class object;
   (5) responsive to a request for said Java class object from said first computing entity, selecting a software module for building a resource of the type to which said Java class object corresponds, said resource being in the form of an XMI document;
   (6) subsequent to step (5), building an XMI document for containing said Java class object using said selected software module, said XMI document populated with information defining said resource, but not containing said Java class object;
   (7) subsequent to step (6), inserting only said Java class object into said XMI document;
   (8) subsequent to step (7), transmitting said XMI document to said first computing entity using said transport mechanism; and
   (9) subsequent to step (8), providing to said first computing entity said Java class object.

5. A method for exchanging Java class objects between two computing entities in an object-oriented programming environment using a transport mechanism in which said Java class objects are contained in files, each file defining a resource, each resource designed to contain a plurality of particular ones of said Java class objects, said method comprising the steps of:
   (1) providing a resource factory for building resources in the form of XMI documents, said factory including a plurality of software modules for building resources from a data source, each said software module designed to build a resource of a particular type;
   (2) responsive to a request for a Java class object from a first computing entity, selecting a software module for building a resource of the type to which said Java class object corresponds;
   (3) subsequent to step (2), building a resource in the form of an XMI document for containing said Java class object using said selected software module, said resource populated with information defining said resource, but not containing said Java class object;
   (4) subsequent to step (3), inserting said Java class object into said XMI document;
   (5) subsequent to step (4), transmitting said XMI document to said first computing entity using said transport mechanism;
   (6) subsequent to step (5), providing to said first computing entity said Java class object.
   (7) providing a reflection adapter factory for populating Java class objects within resources, said factory adapted to provide software modules for populating Java class objects, each said software module designed for an environment corresponding to an Java class object;
   (8) determining whether said first computing entity has stored a property of said Java class;
   (9) if said first computing entity has not stored said property, issuing a request for said property;
   (10) responsive to said request for said property of said Java class object, selecting a one of said reflection adapters for the environment of the particular property;
   (11) populating said Java class object with said property; and
   (12) providing to said first computing unit said property.

6. The method of claim 5 wherein steps (4) and (5) utilize the Meta Object Facility of the Object Management Group specification to read an XMI document.

7. The method of claim 5 wherein, in step (2), said information defining said resource comprises at least a package object of said resource.

8. A method for exchanging Java class objects between two computing entities in an object-oriented programming environment using a transport mechanism in which said Java class objects are contained in XMI documents, each file defining a resource, each resource designed to contain a plurality of particular ones of said Java class objects, said method comprising the steps of:
- (1) providing a resource factory for building resources, said factory including a plurality of software modules for building resources from a data source, each said software module designed to build a resource of a particular type;
- (2) responsive to a request for an Java class object from a first computing entity, selecting a software module for building an XMI document of the type to which said Java class object corresponds;
- (3) subsequent to step (2), building an XMI document for containing said Java class object using said selected software module, said XMI document populated with information defining said resource, but not containing said Java class object;
- (4) subsequent to step (3), inserting said Java class object into said XMI document;
- (5) subsequent to step (4), transmitting said XMI document to said first computing entity using said transport mechanism;
- (6) subsequent to step (5), providing to said first computing entity said Java class object.
- (7) providing a reflection adapter factory for populating Java class objects within resources, said factory adapted to provide software modules for populating Java class objects, each said software module designed for an environment corresponding to a Java class object;
- (8) determining whether said first computing entity has stored a property of said Java class;
- (9) if said first computing entity has not stored said property, issuing a request for said property;
- (10) responsive to a request for said property of said Java class object, selecting a one of said reflection adapters for the environment of said property;
- (11) determining whether said selected reflection adapter has previously reflected said property;
- (12) if said first computing entity has previously reflected said property, populating said Java class object with said property; and
- (13) providing to said first computing unit said property.

* * * * *